Dec. 13, 1932.                H. E. ALTGELT                    1,890,450
                            TRACTOR IMPLEMENT
                          Filed March 19, 1928          5 Sheets-Sheet 4
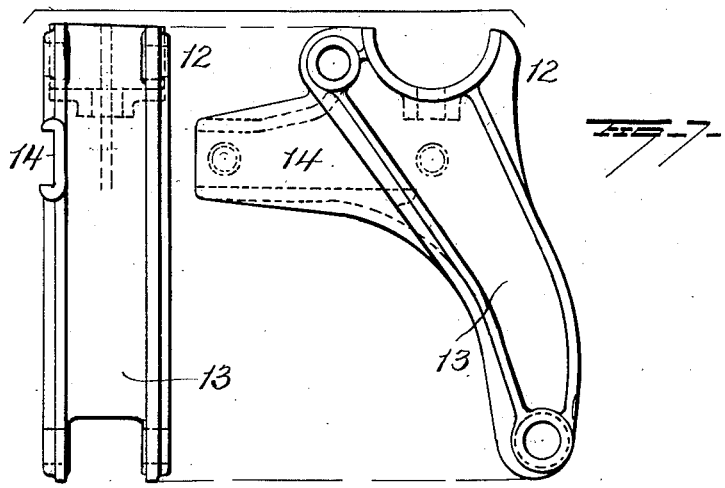
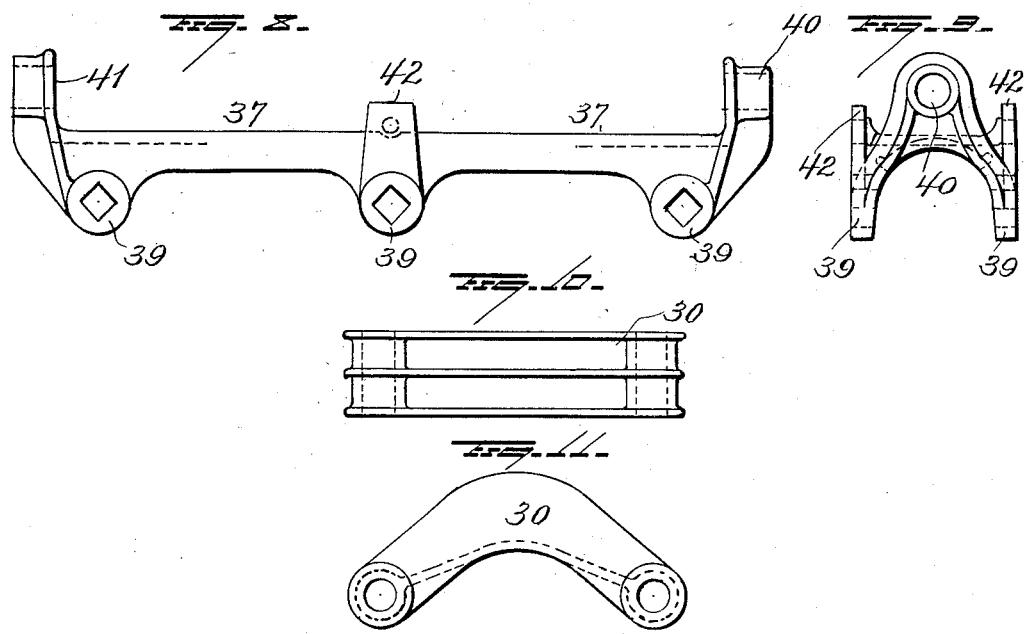
Inventor
H. E. Altgelt
By Seymour & Bright
Attorneys Dec. 13, 1932.    H. E. ALTGELT    1,890,450
TRACTOR IMPLEMENT
Filed March 19, 1928    5 Sheets-Sheet 5
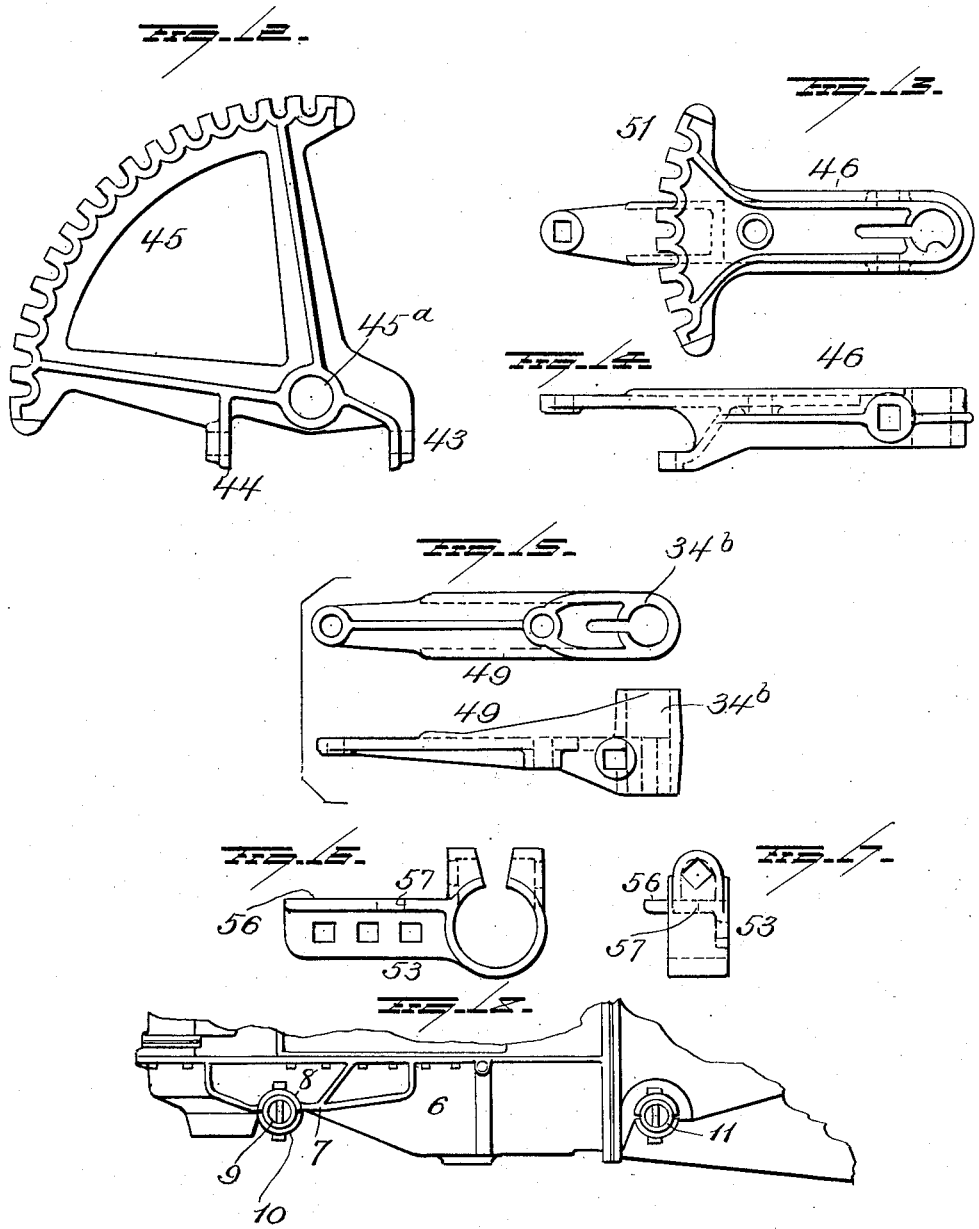

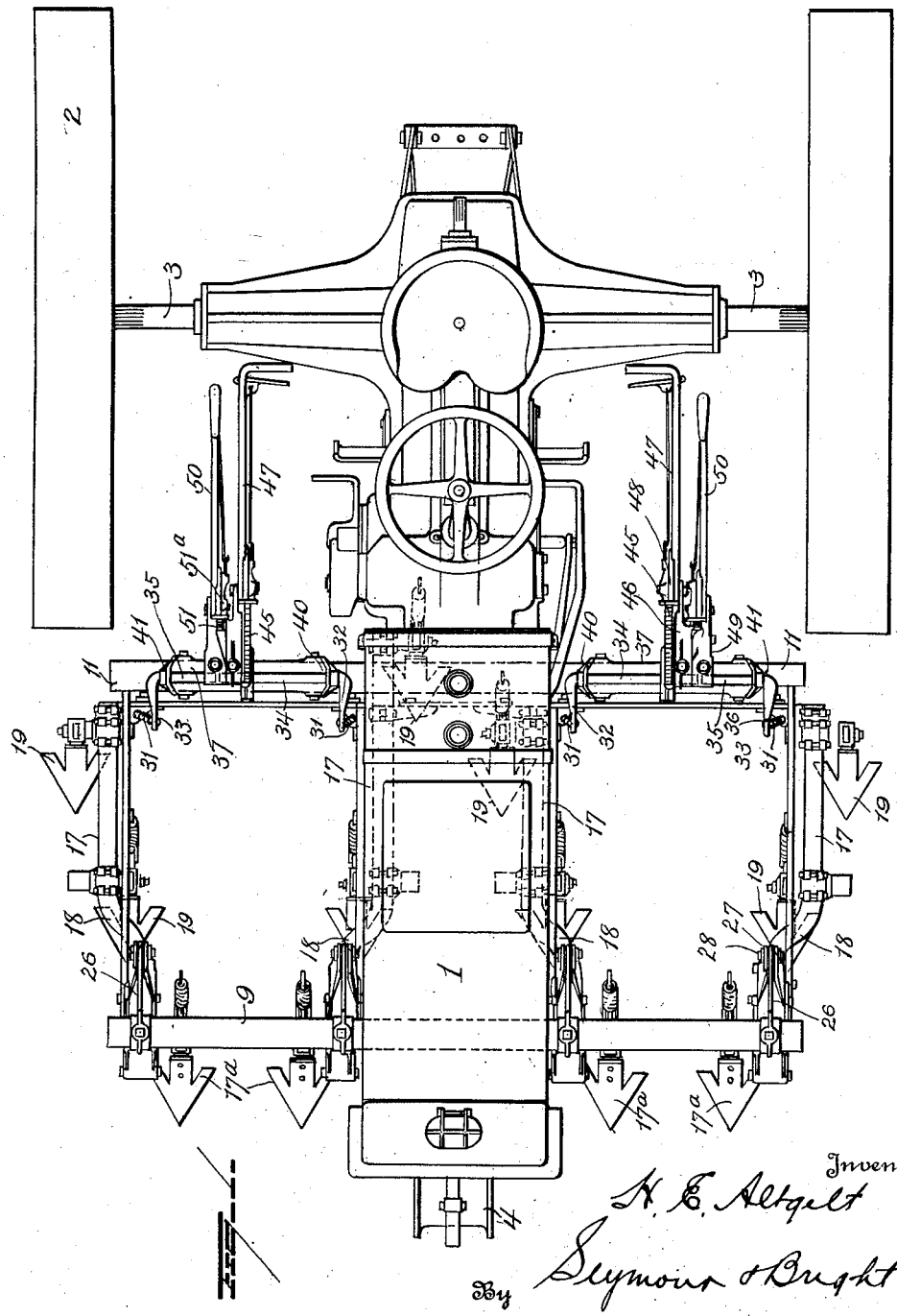

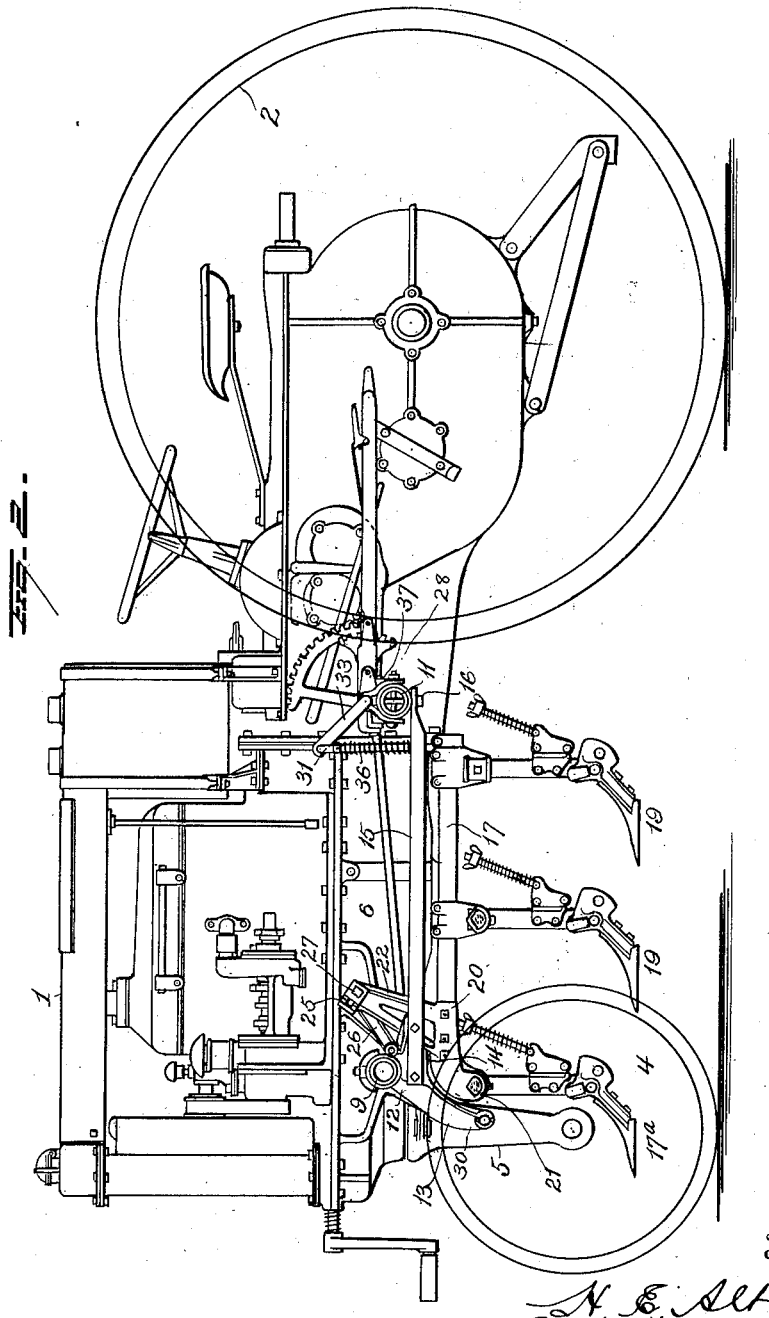

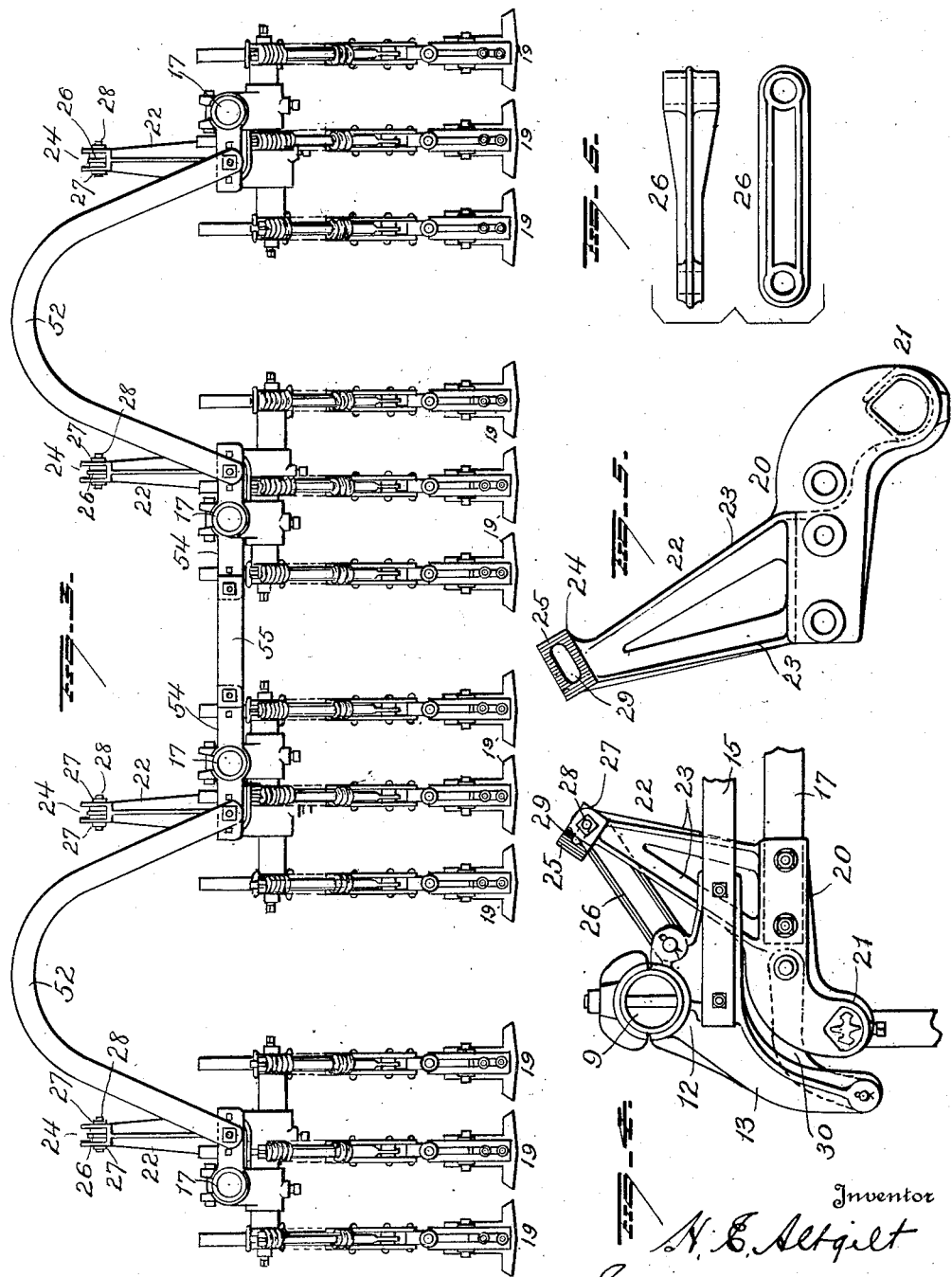

Patented Dec. 13, 1932

1,890,450

UNITED STATES PATENT OFFICE

HERMAN E. ALTGELT, OF SOUTH BEND, INDIANA, ASSIGNOR, BY MESNE ASSIGNMENTS, TO OLIVER FARM EQUIPMENT COMPANY, A CORPORATION OF DELAWARE

TRACTOR IMPLEMENT

Application filed March 19, 1928. Serial No. 262,929.

This invention relates to improvements in tractor implements and more particularly to means for connecting earth-working tools with the tractor and for regulating and adjusting said tools.

One object of my present invention is to provide simple and efficient devices so associated with a tractor that earth working means shall be effectually carried and supported in adjusted positions by the tractor forwardly of the rear axle and tractor wheels thereof and rearwardly of the front wheel axis.

A further object is to so construct and arrange the devices between the earth working elements and the tractor, that simple and efficient means shall be provided for raising and lowering gangs of earth-working elements in vertical planes by power applied to the rear portions of said gangs.

A further object is to provide a construction in which provision shall be made whereby the rear portions of the gang beams may be set higher or lower with relation to the front ends of said gang beams.

With these and other objects in view, the invention consists in certain novel features of construction and combinations of parts as hereinafter set forth and pointed out in the claims.

In the accompanying drawings:—

Figure 1 is a plan view of a tractor cultivator illustrating an embodiment of my invention;

Figure 2 is a view in side elevation;

Figure 3 is a partial view showing features of the cultivator structure;

Figure 4 is a view showing the connections between a cultivator beam and the forward cross bar;

Figure 5 is a detail view of bracket 20;

Figure 6 shows the upper link 26;

Figure 7 is a detail view of one of the hangers 12;

Figures 8 and 9 are detail views of one of the saddles 37;

Figures 10 and 11 are detail views of one of the links 30;

Figure 12 is a detail view of the sector 45;

Figures 13 and 14 are detail views showing a lever end;

Figure 15 is a detail view of lever end 49;

Figures 16 and 17 are views of the arch brackets 53, and

Figure 18 is a fragmentary view showing connections of the cross bars with the tractor.

A tractor is illustrated at 1 and in the present instance, said tractor is of that type in which traction wheels 2 are located upon the projecting portions of rear axle members 3, and in which the forward portion of the tractor body is supported by a single front steering wheel 4, and in the present instance, the bracket 5 in which said front wheel is mounted has a swivel mounting under the forward end portion of the tractor structure.

The crank case or oil pan 6 of the tractor is provided near its forward end and at respective sides, with ribs which form, in effect, brackets 7 and these provide bearings 8 for a cross bar or beam 9. See Fig. 18. In the embodiment of the invention shown in the drawings, the cross bar or beam 9 is tubular in form and is secured rigidly to the bearings on the crank case or oil pan 6 of the tractor by means of clamps 10. The cross bar or beam 9 extends under the crank case and projects considerable distances laterally beyond respective sides of the tractor body, so that it shall constitute anchoring or connecting means for agricultural implements. In the present instance, I have shown cultivating devices having their forward portions connected, through intermediate devices, with said cross bar. The cross bar or beam 9 is shown as having such length as to terminate in line with portions of the treads of the rear tractor wheels, but when other implements, such as planting devices, are connected with the tractor, said cross bar will preferably be made longer and for some purposes, it may be made shorter than what is shown in the drawings.

Another cross bar or beam 11 (also preferably of tubular form) extends under the tractor and is securely fastened to the transmission housing,—said cross bar or beam 11 projecting laterally beyond opposite sides of the tractor and, in the embodiment of the invention shown in the drawings, being of a length equal to that of the forward cross bar on beam 9. The cross bar or beam 11 serves, in the present instance, to support certain parts of the mechanism for the cultivator appliances, as more fully hereinafter explained.

In the drawings, I have shown two cultivator gangs at each side of the tractor, so that the attachment as shown may be termed a two-row motor cultivator structure. At each side of the tractor, two hangers 12, 12 are securely clamped to the forward cross bar or beam 9,—one of said hangers being located near the side of the tractor and the other near the outer end of said cross bar. Each hanger 12 includes a depending arm 13 which projects somewhat forwardly, and a rearwardly projecting arm 14 to which latter, the forward end portion of a brace bar 15 is securely bolted,—the rear end portion of each brace bar 15 being bolted to the rear cross bar or beam 11, as indicated at 16. The brace bars 15 serve to keep the hangers 12 in proper position and to prevent the forward tubular cross bar or beam 9 (with which latter the forward portions of the cultivator gangs are connected) from becoming twisted when the cultivator is used in heavy soil.

Each cultivator gang comprises a cultivator beam 17 preferably having a lateral bend at 18 so that one portion of the beam is offset laterally with respect to the other portion, and to each beam a plurality of cultivator earth-working elements 19 will be secured in offset relation to each other. Each cultivator beam 17 is secured at its forward end to a bracket 20 having a depending arm 21. To the forward depending arm 21 of each bracket, the forward cultivator earth working element 17ª of one of the gangs is secured, and the shovel of said element is caused to project somewhat forwardly of the plane of the axis of the front wheel 4 of the tractor, as clearly shown in Fig. 2.

Each bracket 20 includes a post 22 which may comprise two members 23, 23 rigid at their lower ends with the body of the bracket and united at their upper ends,—the upper end of said post being provided with a bifurcated head 24, having the outer faces of its arms toothed as at 25. The bifurcated head 24 of each post 22 receives one end of a link 26, the other end of which is pivotally connected with the hanger 12 in proximity to the connection of the latter with the cross bar or beam 9. Plates or disks 27, having toothed inner faces to engage the toothed outer faces 25 of the bifurcated head 24, are provided with holes for the accommodation of a bolt 28, which latter also passes through slots 29 in said bifurcated head and serves as the pivotal support of the upper end of link 26. A bent link 30 is pivoted at its lower forward end to the lower end of the hanger arm 13 and at its rear end to the adjacent bracket 20 rearwardly of the forward end of the latter.

At each side of the tractor, the rear ends of the cultivator beams of each pair are supported, through the medium of rods 31 from crank arms 32, 33 respectively on short shafts 34, 35,—springs 36 preferably being employed to permit vertical yielding of the gang beams, and the crank shafts of each pair are normally held against turning by means of lever and segment devices as hereinafter described in detail.

A saddle 37 is mounted upon the rear cross bar or beam 11, (one of said saddles being located at each side of the tractor) and secured thereto by means of bolts 38 passing through bosses 39 on said saddle and through said cross bar. Each saddle is provided at its ends with bearings 40, 41 for the crank shafts 34, 35 respectively and the intermediate portion of said saddle is provided with lugs 42, 42, to which arms 43, 44 at the base of a sector 45 are connected. Each sector 45 is provided at 45ª with a bearing which aligns with the bearing 40 at one end of the saddle, for the accommodation of the crank shaft 34, which latter projects beyond its mounting in the sector and has rigidly secured to it, a lever end 46 for a hand lever 47, said lever carrying a detent 48 for cooperation with the sector 45. The crank shaft 34 projects beyond the lever end 46 as at 34ª and enters a socket 34ᵇ in a lever end 49 for an auxiliary lever 50,—said lever end 49 being rigidly secured to the crank shaft 35. It will be observed that the bearing for the inner end of the crank shaft is effected by the mounting of the lever end 49 upon the projecting end 34ª of the crank shaft as shown in Fig. 1. The lever end 46 of the main lever is formed with a sector 51 and with this sector, a detent 51ª carried by the lever 50 cooperates.

With the construction herein described and shown in the drawings, it will be observed that the forward end of each gang structure is connected with the forward cross beam 9 through the medium of parts which constitute in effect, a parallelogram, such structure comprising the upper and lower links 26 and 30 and the hanger 12 and bracket 20 with which said links are pivotally connected. With such construction, when lifting power is applied to the rear ends of the gang structures, said structures will be caused to rise in substantially vertical planes. Should it be desired to adjust the rear ends of the gang structures relatively to the forward ends, this may be easily effected by shifting the pivotal connection between the links 26 and the post 22 of bracket 20, with the use of the adjusting devices hereinbefore described.

It will be observed that in the embodiment of the invention shown in the drawings the forward portions of the cultivator gang structures are connected with the forward cross beam on the tractor and that the rear ends of said cultivator gang structures are supported by the rear cross beam on the tractor, through the medium of the raising and lowering mechanism mounted upon said rear cross beam. It will also be observed that with the use of the raising and lowering and adjusting mechanism herein shown and described, both gangs at either side of the tractor may be raised, lowered or adjusted simultaneously by manipulation of one of the main levers 47 and that the outer gangs only may be manipulated by operation of the auxiliary levers 50 so that the said outer gangs may be adjusted with respect to the inner gangs.

In order that the gangs of each pair may be mounted properly spaced and to provide means whereby the spacing of said gangs may be adjusted, I provide connecting members 52 adjustably connected with the beams of the gangs of each pair. In the embodiment of the invention shown in the drawings, the connecting or spacing members 52 are made in the form of arches and each of these is adjustably connected at its ends with arms or brackets 53 secured to the gang beams,—said arms being provided, each with a plurality of holes to permit adjustable connection of the ends of the arches. Other brackets 54 may be secured to the inner cultivator beams and are connected together by a bar 55 under the tractor as shown in Fig. 3. The arms or brackets 53 may be provided with perforated flanges 56 for accommodation of the lifting rods or links 31 in effecting connection of said rods or links with the cultivator beams.

Having fully described my invention what I claim as new and desire to secure by Letters-Patent, is:—

1. The combination with a tractor and a beam secured thereto and projecting laterally from its forward portion, of a hanger secured to said beam and having a depending arm, an earth-working structure including a beam and a bracket secured to the forward portion of said last-mentioned beam, said bracket including an upwardly projecting post, a link connection between the upper portion of said post and said hanger, a link connection between said bracket and the depending arm of the hanger, and means for raising and lowering said earth-working structure.

2. The combination with a tractor and a beam secured thereto and projecting laterally from its forward portion, of a hanger secured to said beam and having a depending arm, an earth-working structure including a beam and a bracket secured to the forward portion of said last-mentioned beam, said bracket including an upwardly projecting post, a link connection between the upper portion of said post and said hanger, a link connection between said bracket and the depending arm of the hanger, means for raising and lowering said earth-working structure, and a support on an intermediate portion of the tractor for said last-mentioned means, said raising and lowering means being connected with the rear portion of the beam of the earth-working structure.

3. The combination with a tractor and a beam projecting laterally from its forward portion, of a hanger secured to said beam, an earth-working structure including a beam and a bracket secured to said beam, a link connection between said bracket and the lower portion of said hanger, an upwardly projecting post on said bracket, a link pivoted at one end to said hanger, an adjustable pivotal connection between the other end of said last-mentioned link and said post, and raising and lowering means supported by the tractor and connected with the rear portion of the beam of the earth-working structure.

4. The combination with a tractor and a beam projecting from its forward portion, of a hanger secured to said beam, an earth working structure including a beam and a bracket secured to the forward portion of the same, a link connecting the lower portion of said hanger with said bracket, a post on said bracket and having a bifurcated upper end, each branch of which is provided with a slot, a link pivoted at one end to said hanger and entering at its other end the bifurcated portion of said post, a bolt passing through the slots in the post and through said link, means for securing said bolt in adjusted position to said post, and means for supporting the rear portion of the earth working structure.

5. The combination with a tractor, a beam secured to and projecting laterally from the forward portion of the tractor, and a rear beam projecting laterally from an intermediate portion of the tractor, of an earth-working structure, means whereby the forward portion of said structure is loosely supported by the forward beam on the tractor, a saddle secured upon the rear laterally projecting beam and having upstanding bearings at its ends, a crank shaft journaled in the bearings on said saddle, a connection between a crank arm of said crank shaft and the rear portion of said earth-working structure, a lever for operating said crank shaft secured to one end thereof, and a sector whereby said lever may be locked in adjusted position.

6. The combination with a tractor, a forward beam secured to and projecting laterally from the forward portion of the tractor, and a rear beam projecting laterally from an intermediate portion of the tractor, of a plurality of earth-working structures spaced apart, means whereby the forward portions of said structures are loosely connected with the forward laterally projecting beam, a saddle having depending elements spanning and secured to the rear laterally projecting beam, two crank shafts mounted on said saddle, connections between said crank shafts and the respective earth-working structures, a sector secured to said saddle, a lever secured to one of said shafts and cooperable with said sector, a sector carried by the said lever, and a supplemental lever secured to the other crank shaft and having a socket receiving the end of the adjacent crank shaft.

7. The combination with a tractor, a forward transversely extending beam secured to said tractor at a point rearwardly of the axis of the front wheel, a second transversely extending beam secured to said tractor and located forwardly of the rear axle thereof, brace bars securing the outer ends of said beams together, of earth-working structures carried by said transverse beams, including a plurality of longitudinal tool carrying beams, parallel link structures forming the connection between said tool carrying beams and the forward transverse beam, and raising and lowering means carried by said rear transverse beam and connected to the rear end of said tool beams.

8. The combination with a tractor, a forward transversely extending beam secured to said tractor at a point rearwardly of the axis of the front wheel, a second transversely extending beam secured to said tractor and located forwardly of the rear axle thereof, brace bars securing the outer ends and intermediate portions of said beams together, of earth-working structures carried by said beams including a plurality of longitudinal tool beams, parallel link structures forming the connections between the forward ends of said tool beams and said forward transverse beam and raising and lowering means carried by said rear transverse beam and connected to the rear end of said tool beam.

9. The combination with a tractor having rear traction means and front steering means, a beam secured to the forward portion of said tractor and projecting laterally therefrom, of an earth working structure disposed adjacent and at the rear of the beam, and connections between the forward portion of said earth working structure and said beam, said connection comprising a plurality of links, the fixed pivots on said beam being horizontally and vertically spaced apart from each other whereby the earth working structure may be elevated to its raised or inoperative positions unobstructedly beneath said first named beams.

10. The combination with a tractor having rear traction and front steering means, a beam secured thereto and projecting laterally from the forward portion thereof, of an earth working structure including a longitudinally extending beam, a hanger secured to said laterally projecting beam, a bracket secured to the beam of the earth working structures, a link connection between said hanger and said bracket, the forward pivot of said link with said hanger being located at a point rearwardly of said first mentioned beam, a link connection between said hanger and the beam of said earth working structure, the forward pivot of said last named link being located at a point forwardly of said first mentioned beam, whereby said earth working structure may be elevated to its raised or inoperative position unobstructedly beneath said first named supporting beam.

11. The combination with a tractor, a forward transversely extending beam secured to said tractor at a point rearwardly of the axis of the front wheel, a second transversely extending beam extending through the frame structure of the tractor and located forwardly of the rear axle thereof, a depending bracket secured to the forward beam, a brace bar securing said depending bracket with the rear transverse beam, an earth working structure connected with said bracket, including a plurality of longitudinal tool carrying beams, parallel linked structures forming the connection between said tool carrying beams and the forward transverse beam, and raising and lowering means carried by said rear transverse beam and connected to the rear end of said tool beam.

12. The combination with a tractor having front steering and rear traction means, a forward transversely extending beam secured to said tractor at a point rearwardly of the front steering means, a second transversely extending beam secured to said tractor and located forwardly of the rear traction means, depending brackets secured to said forward transverse beam, brace bars connecting said brackets with said rear transverse beams, of earth working structures connected with said brackets, including a plurality of longitudinal tool carrying beams, pivoted connections forming the connection between said tool carrying beam and the forward transverse beam, and raising and lowering means carried by said rear transverse beam and connected to the rear end of said tool beam.

In testimony whereof, I have signed this specification.

HERMAN E. ALTGELT.